US009066085B2

(12) United States Patent
Cluff et al.

(10) Patent No.: US 9,066,085 B2
(45) Date of Patent: Jun. 23, 2015

(54) STEREOSCOPIC CAMERA OBJECT DETECTION SYSTEM AND METHOD OF ALIGNING THE SAME (71) Applicant: DELPHI TECHNOLOGIES, INC., Troy, MI (US)

(72) Inventors: Charles A. Cluff, Zionsville, IN (US); Ronald M. Taylor, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 399 days.

(21) Appl. No.: 13/713,445

(22) Filed: Dec. 13, 2012

(65) Prior Publication Data
US 2014/0168377 A1 Jun. 19, 2014

(51) Int. Cl.
H04N 13/02 (2006.01)
G06T 7/00 (2006.01)

(52) U.S. Cl.
CPC ............ *H04N 13/0246* (2013.01); *G06T 7/002* (2013.01); *G06T 2207/10021* (2013.01); *G06T 2207/30252* (2013.01)

(58) Field of Classification Search
CPC ........... B60Q 9/005; G01S 5/16; G06T 7/002; G06T 2207/10021; G06T 2207/30252; H04N 13/0246
See application file for complete search history.

(56) References Cited

U.S. PATENT DOCUMENTS

| 5,059,771 | A | 10/1991 | Ip et al. |
| 6,748,105 | B1 | 6/2004 | Mancuso et al. |
| 7,486,835 | B2 | 2/2009 | Zhang et al. |
| 8,233,031 | B2 | 7/2012 | Saito |
| 2005/0163343 | A1* | 7/2005 | Kakinami et al. ............ 382/103 |
| 2008/0089557 | A1* | 4/2008 | Iwaki et al. .................. 382/106 |
| 2008/0144924 | A1 | 6/2008 | Hoffmann |
| 2009/0122136 | A1 | 5/2009 | Shiraishi et al. |
| 2010/0020178 | A1 | 1/2010 | Kleihorst |
| 2011/0057948 | A1 | 3/2011 | Witt et al. |

FOREIGN PATENT DOCUMENTS

| DE | 10 2010 042821 A1 | 4/2012 |
| DE | 10 2012 009577 A1 | 11/2012 |
| WO | 2012/120856 | 9/2012 |

OTHER PUBLICATIONS

European Search Report dated Dec. 9, 2014.

* cited by examiner

*Primary Examiner* — Huy T Nguyen
(74) *Attorney, Agent, or Firm* — Lawrence D Hazelton (57) ABSTRACT A system, controller, and method for aligning a stereo camera of a vehicle mounted object detection system that includes a first camera and a second camera mounted spaced apart on a vehicle. An image from each camera at two different times is used to determine an observed displacement of an object relative to the vehicle. A predicted displacement of the object relative to the vehicle is also determined using either a difference of vehicle position measured based on other vehicle measurements or GPS, or a difference of size of the object in images taken at the two different times. Alignment is provided by determining a triangulation correction based on a difference of the observed displacement and the predicted displacement to correct for misalignment of the cameras.

11 Claims, 10 Drawing Sheets

STEREOSCOPIC CAMERA OBJECT DETECTION SYSTEM AND METHOD OF ALIGNING THE SAME

TECHNICAL FIELD OF INVENTION

This disclosure generally relates to a stereoscopic camera object detection system for a vehicle and a method for aligning the cameras of the system, and more particularly relates using a secondary means to estimate relative motion or displacement between the object and the vehicle to determine a triangulation correction or triangulation offset to correct for misalignment of the cameras when determining object location based on triangulation of images from the cameras.

BACKGROUND OF INVENTION

Driver assistance systems gather information about an area proximate to a vehicle to provide better awareness to an operator of the vehicle regarding, for example, other vehicles and objects in the travel path of the vehicle. This information can be sensed with numerous technologies. The development of affordable and reliable digital vision technology allows for providing vision based object detection systems. Monocular vision systems using a single camera or other suitable imaging device can detect objects, but have difficulty reliably and accurately determining the range to a detected object. Stereoscopic vision systems add a second camera so the system can more reliably determine the range to an object. Such stereoscopic vision systems determine range by detecting the object from the different perspectives of each camera, and then use triangulation based on a separation distance of the cameras and a position disparity of the object in the images from each camera. For example, an object that is closer to a stereo vision system will have a greater image disparity of simultaneously captured images from the two cameras when compared to that same object at a greater distance.

Stereo vision ranging performance can be improved by reducing the field of view or increasing the lens focal length of the cameras used. This has the effect of increasing the image size of objects that remain within the narrower field of view, while eliminating or truncating objects that intersect with or fall outside of that field of view. However, this option is not considered desirable for vehicle systems where a wide field of view is preferred to observe objects of interest in the distance and one that may not be directly in front of the car, such as roadside objects on a curve, or other vehicles approaching an intersection from a crossing street.

Stereo ranging performance can be also increased by increasing the resolution of the imager used in the cameras. However, increased resolution usually results in higher overall system cost and a possible reduction in overall system sensitivity, for example, reduced performance during periods of marginal lighting such as during dusk or dawn.

Stereo ranging performance can be improved by increasing the separation distance between the cameras. Maintaining proper alignment of the separate cameras is critical to the performance of the system. However, proper alignment typically requires that both cameras be mounted on a structure that is sufficiently rigid to maintain alignment of the cameras over the operating life of the system. Increasing the separation distance naturally increases the size, mass and cost of the mounting structure.

SUMMARY OF THE INVENTION

Described herein is a system, a controller for the system, and a method that uses multiple images from stereoscopic cameras to determine an observed displacement of an object, and compares that observed displacement to a predicated displacement based on motion of the vehicle on which the system is mounted. The comparison is used to compensate for misalignment of the stereoscopic cameras. By way of further explanation and not limitation, as the vehicle travels, objects in the field of view of the cameras will change positions or "flow" within the captured images. If the cameras are physically aligned, the flow of objects within the field of view of the cameras will correspond to the motion of the vehicle in a predictable manner. Any misalignment of the cameras will cause additional unexpected or unknown disparity between the observed displacement, and the predicted displacement or the motion of the object relative to the vehicle, and so would indicate that some portion of the system is not aligned properly. This change in measured disparity can be used to adjust or compensate for the expected disparity values between the two cameras.

In accordance with one embodiment, a method for aligning a stereo camera of a vehicle mounted object detection system is provided. The system includes a first camera and a second camera mounted spaced apart on a vehicle. The method includes the step of determining a first position of an object in a first image from the first camera captured at a first time. The method also includes the step of determining a second position of the object in a second image from the second camera captured at the first time. The method also includes the step of determining an initial location of the object relative to the vehicle at the first time based on triangulation of the first image and the second image. The method also includes the step of determining a third position of the object in a third image from the first camera captured at a second time distinct from the first time. The method also includes the step of determining a fourth position of the object in a fourth image from the second camera captured at the second time. The method also includes the step of determining a subsequent location of the object relative to the vehicle at the second time based on triangulation of the third image and the fourth image. The method also includes the step of determining an observed displacement of the object relative to the vehicle based on a difference of the initial location and the subsequent location. The method also includes the step of determining a predicted displacement of the object relative to the vehicle based on one of a) a difference of vehicle position at the first time and the second time, and b) a difference of an initial size of the object in the first image and a subsequent size of the object in the third image. The method also includes the step of determining a triangulation correction based on a difference of the observed displacement and the predicted displacement to correct for misalignment of the first camera and the second camera when determining object location based on triangulation of images from the first camera and the second camera.

In another embodiment, an object detection system for detecting an object proximate to a vehicle is provided. The system includes a first camera configured to be mounted on the vehicle, and a second camera configured to be mounted on the vehicle spaced apart from the first camera. The system also includes a controller configured to receive images from the first camera and the second camera. The controller is also programmed to carry out the steps described above with regard to the method.

In yet another embodiment, a controller for an object detection system for detecting an object proximate to a vehicle is provided. The controller includes a first input configured to receive a first signal from a first camera mounted on the vehicle, and a second input configured to receive a second signal from a second camera mounted on the vehicle spaced apart from the first camera. The controller also includes a processor configured to receive images from the first camera and the second camera. The controller or the processor is programmed to carry out the steps described above with regard to the method.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which:

FIG. 2 (FIGS. 2A and 2B combined) is a flowchart of a method executed by the system of FIG. 1 in accordance with one embodiment;

DETAILED DESCRIPTION

One way to improve the performance of a stereoscopic vision system is to devise a way to align 'electronically' the images captured by the individual cameras so that maintaining alignment does not rely on a rigid mounting structure. This will further improve system performance by allowing for increased separation distance between the cameras, while avoiding the undesirable cost, mass, ergonomic, and practical limitations of a common mounting structure. Stereoscopic cameras for vehicles that are mounted on a common structure with a separation of 250 to 300 millimeters between optical centerlines of the cameras are known. The teachings presented herein allow the cameras to be mounted on opposite sides of the vehicle, thereby achieving a separation of 1000 millimeters (1 meter) or more between optical centerlines. Increasing the separation distance by a factor of four will increase the ranging accuracy by a factor of four. The teachings presented herein provide this improvement without incurring the numerous disadvantages of having the sensor on a rigid mounting structure.

Figure 1:
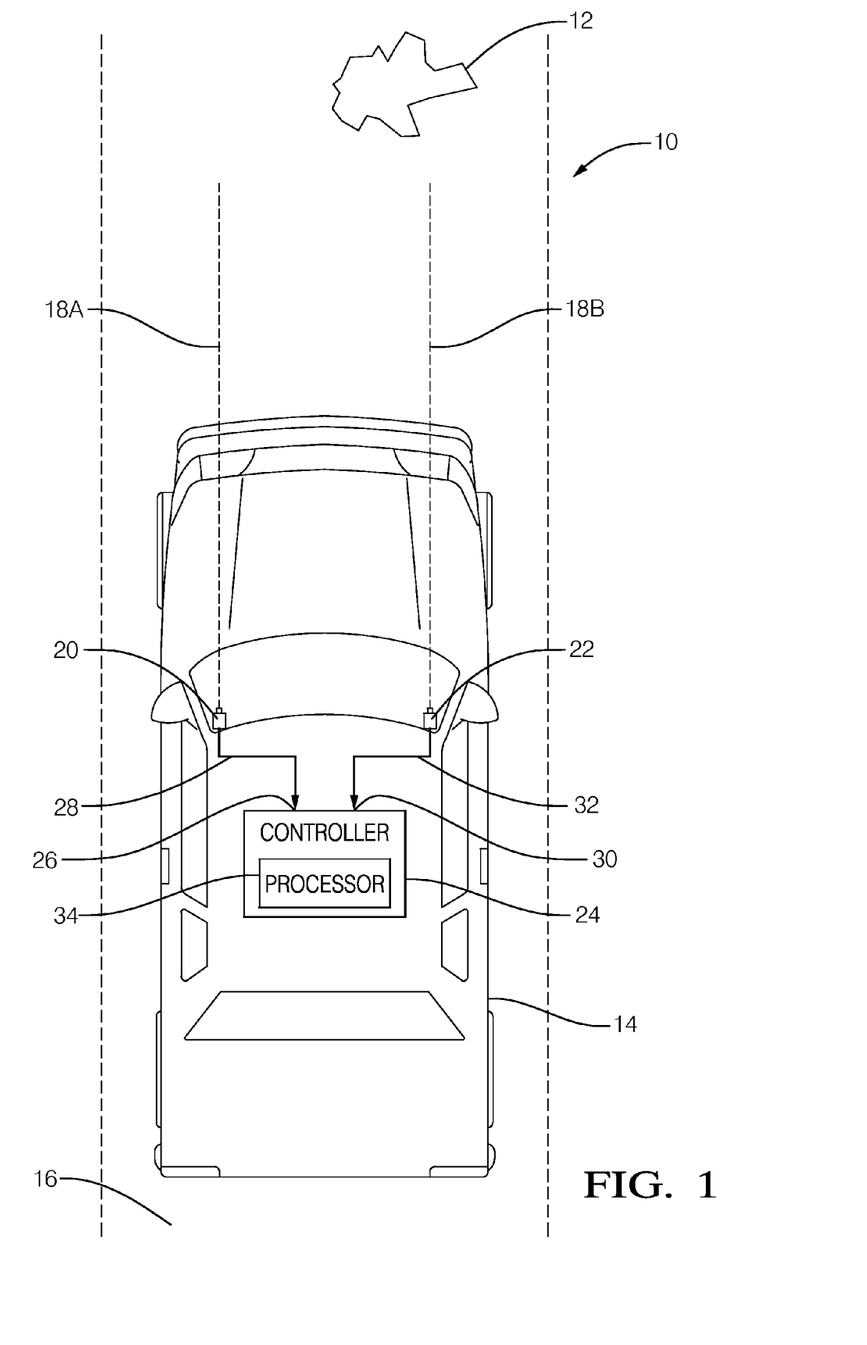
FIG. 1 is top view of a vehicle equipped with stereoscopic cameras for an object detection system in accordance with one embodiment.

FIG. 1 illustrates a non-limiting example of an object detection system, hereafter the system 10, for detecting an object 12 proximate to a vehicle 14. The object 12 is illustrated as an irregular shape in this example. The object 12 could be any object that the vehicle 14 may encounter while traveling. By way of example and not limitation, the object 12 may be an animal or pedestrian either on or beside a roadway 16 on which the vehicle 14 is traveling, a road sign above or alongside the roadway 16 or another vehicle. While not specifically shown, it is contemplated that if the object 12 is detected at a location that may eventually lead to a collision between the vehicle 14 and the object 12, the system 10 may be configured to take some intervening action. For example, the intervening action may include, but is not limited to, illuminating a warning light viewable by the operator of the vehicle, reducing engine power, applying the vehicle's brakes, or any other action that may be suitable for avoiding the collision or preparing the vehicle for a seemingly inevitable collision.

The system 10 includes a first camera 20 configured to be mounted on the vehicle 14, and a second camera 22 configured to be mounted on the vehicle 14 at a location on the vehicle 14 that is spaced apart from the first camera 20. As used herein, designating the cameras as first and second does not imply that there is any particular ranking of importance of the cameras. The first camera 20 and the second camera 22 could be suitably named the left camera and the right camera respectively. The cameras may be any of many commercially available cameras suitable for capturing images of an area about the vehicle 14, and detecting objects proximate to the vehicle. By way of example and not limitation, the cameras may have a resolution of six-hundred-forty by four-hundred-eighty (640×480), and be fitted with a lens that provides a forty-five degree (45°) horizontal field of view angle. It is recognized that higher resolution cameras are available, and that the field of view angle can be changed to alter the capability of the system 10 to detect distant objects.

In this example, the first camera 20 and the second camera 22 are illustrated as being mounted near the upper left and right hand sides of the windshield of the vehicle. Preferably, the cameras are mounted in the vehicle interior so the lenses are protected from abrasion by airborne dirt as the vehicle 14 travels. Alternatively, the cameras may be mounted near the front bumper of the vehicle. Preferably, the first camera 20 and the second camera 22 are mounted spaced apart at least five-hundred millimeters (500 mm). Typically, it should be relatively easy to mount the cameras to have a separation distance D of at least 1000 millimeters (1000 mm or 1 meter) between a first optical centerline 18A of the first camera 20 and a second optical centerline 18B of the second camera 22. While the optical centerlines 18A and 18B appear to be parallel in FIG. 1, it should be understood that the lack of a rigid structure for mounting he cameras means that the optical centerlines 18A and 18B are likely not parallel, and the teaching set forth herein overcomes this problem. It should be recognized that the greater the separation distance D, the greater the potential accuracy of the system 10 to determine a distance or range from the vehicle 14 to the object 12. It should also be appreciated that the method/means described below for aligning a stereo camera system, i.e. aligning images captured by the first camera 20 and the second camera 22, allows the system 10 to avoid having a rigid mounting structure for the cameras, while still allowing for a relatively wide separation distance D between the cameras.

In general, the controller 24 or the processor 34 is configured or programmed to receive images from the first camera 20 via the first signal 28 at the first input 26, and receive images from the second camera 22 via the second signal 32 at the second input 31. The first signal 28 and the second signal 32 may be a video signal providing a continuous stream of images, or the signals may be periodic snap shots, the taking of which may be initiated by other sensors on the vehicle, for example, a radar sensor (not shown).

Figure 2A:
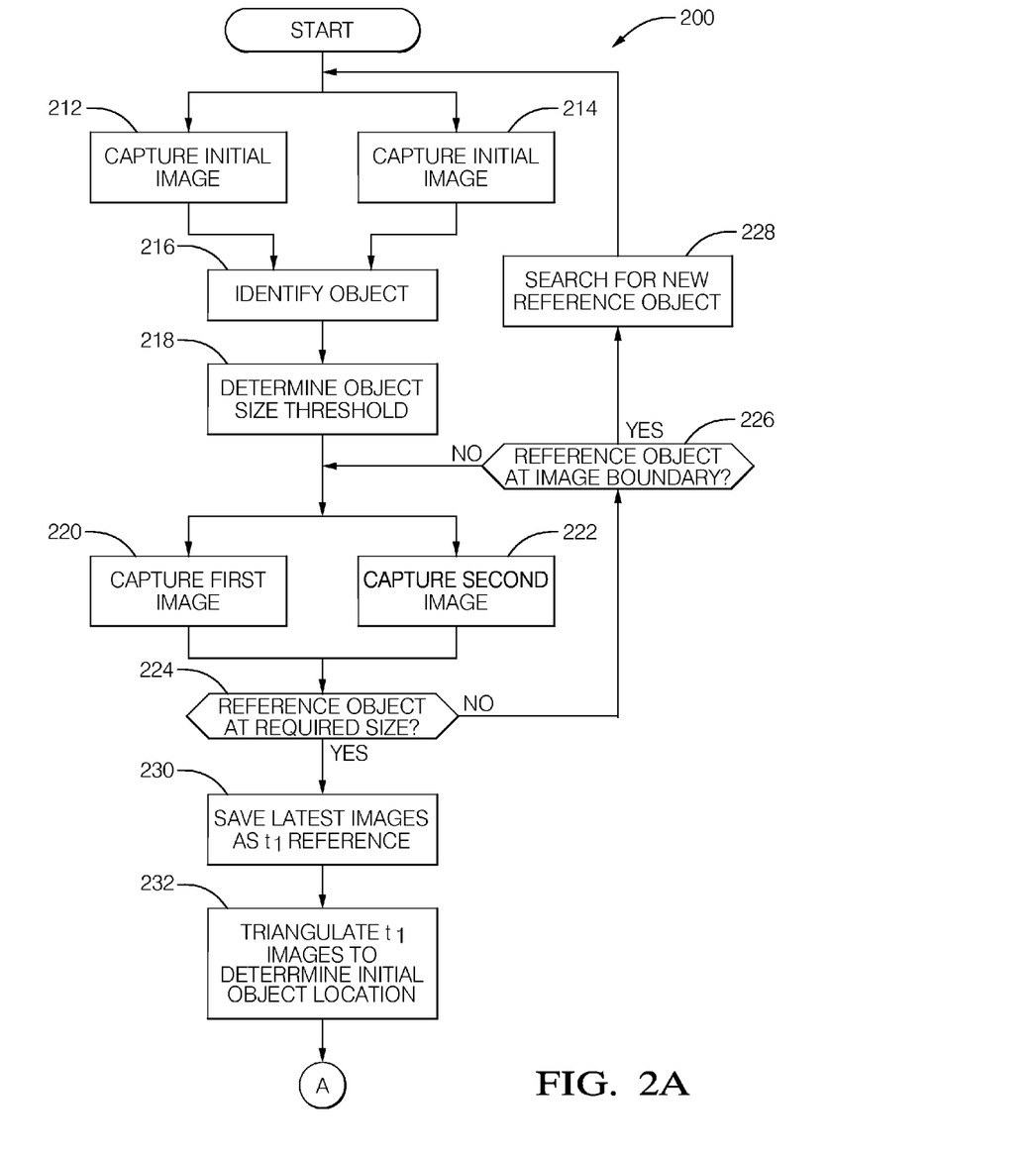
Figure 2B:
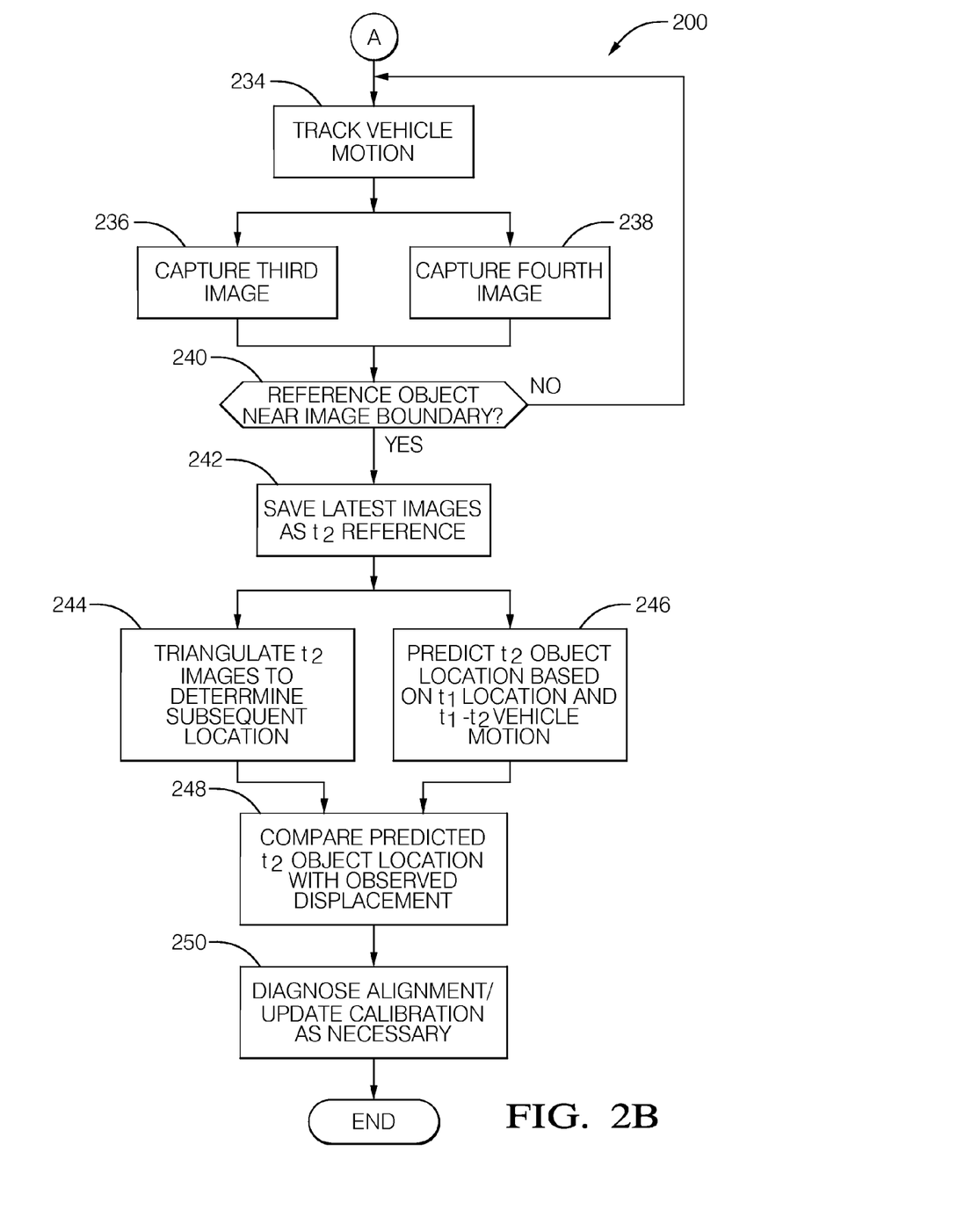

FIG. 2 (2A, 2B) illustrates a non-limiting example of a method 200 suitable for being a basis for programming the controller or the processor 34.

Steps 212 and/or 214 may include capturing an initial image by the first camera 20 in step 212, and/or capturing a second image by the second camera 22 in step 214. It should be understood that at this point in the method 200, the system 10 has not yet identified an object, but is searching images from the camera for an object such as the object 12. Since the images in a stereo system are substantially similar (i.e. ignoring the effects of different perspectives and misalignment of the cameras), only one of these two steps may be required to detect the object 12.

Step 216 may include evaluating the initial images from the first camera 20 and/or the second camera 22 to detect the presence of an object such as the object 12. The object 12 may itself be moving, but it is preferable that the object 12 be stationary in the environment. Furthermore, it is preferred to use a substantially planar object such as a dashed lane marker segment on the road surface or a road sign so that there is minimal ambiguity in the corners, edges or frame of the object as the viewing angle of that object changes due to vehicle motion. As such, the algorithms used to detect the object 12 may be configured to detect such objects preferentially, the method of such preferential detection being known in the optical detection arts.

Figure 3:
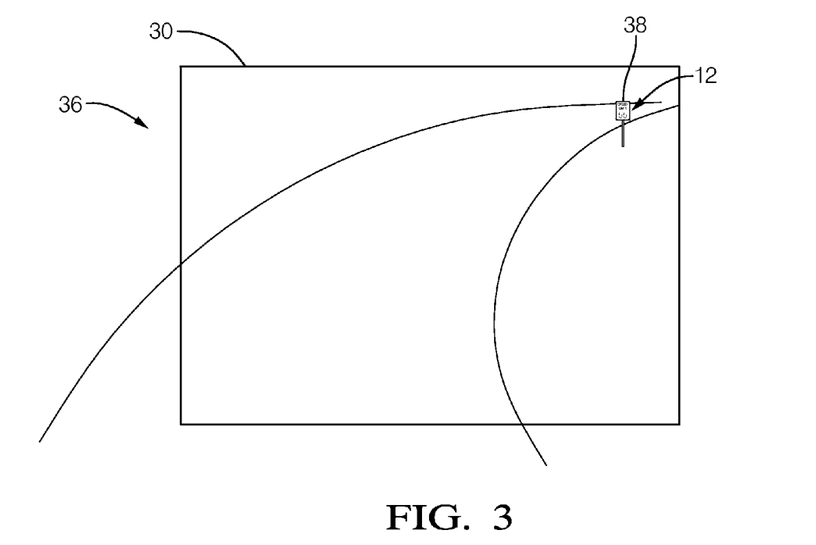
FIG. 3 is an image from a camera of the system of FIG. 1 in accordance with one embodiment.

FIG. 3 illustrates a non-limiting example of an initial image 36 captured by the first camera 20 and/or the second camera 22 in steps 212 and/or 214 that may be used by step 216 to detect or select the object 12. Once the object is selected in step 216, a minimum acceptable size of the object 12 in the initial image 36 may need to be determined. For instance, a dashed lane marker or road sign 38 observed at a distance may initially be too small in the image to use as a basis for reliable distance or range measurement due to the resolution of the images. In this case, the controller 24 may wait for the object 12 (e.g. the road sign 38) to get closer and appear large enough in the image for measurements to be taken, for example using contrast enhancement techniques as described in U.S. Pat. No. 7,486,835 issued to Zhang et al. on Feb. 3, 2009.

Referring again to FIG. 2, Steps 220, 222, 224, and 226 cooperate to define an iterative process of waiting for the object 12 to appear large enough to be used for a range or distance measurement. Step 220 captures a first image from the first camera 20, and step 222 captures a second image from the second camera 22 at substantially the same time as the first image is captured in step 220. As used herein, 'substantially the same time' means that any difference in time that the first and second images are captured by cameras is small enough so that any subsequent comparison of the images, such as using triangulation to determine a distance or range from the vehicle 14 to the object 12, does not cause an unacceptable error.

Step 224 evaluates the size of the object in the first image and/or the second image. If the object 12 has reached an acceptable size, then the control passes to step 230. If not, control passes to step 226.

Step 226, may include determining if the object in the image intersects with a boundary 30 of the image. If yes, the object may not be suitable for use in the displacement determination or disparity correction process, so control passes to step 228 where the previously identified object is abandoned, and control is subsequently passed back to steps 212 and 214 for selection of a new object. If the object 12 is still acceptably within the boundary 30 of the image, the control passes to steps 220 and 222 for capture of subsequent first and second images.

It should be recognized that when the object 12 is detected in step 216, it might already be large enough in the image to be used for the first and second images. In this case, steps 220, 222, 224 and 226 may be skipped, and step 230 uses the images captured in steps 212 and 214 as the first and second images.

Step 230 may include storing the first and second images, and storing a first time t1 at which the images were captured.

Step 232 may include determining an initial location of the object 12 based on the geometry of the location and orientation of the first camera 20 and the second camera 22, and the disparity between the first image and the second image taken at the first time t1.

Figure 4:
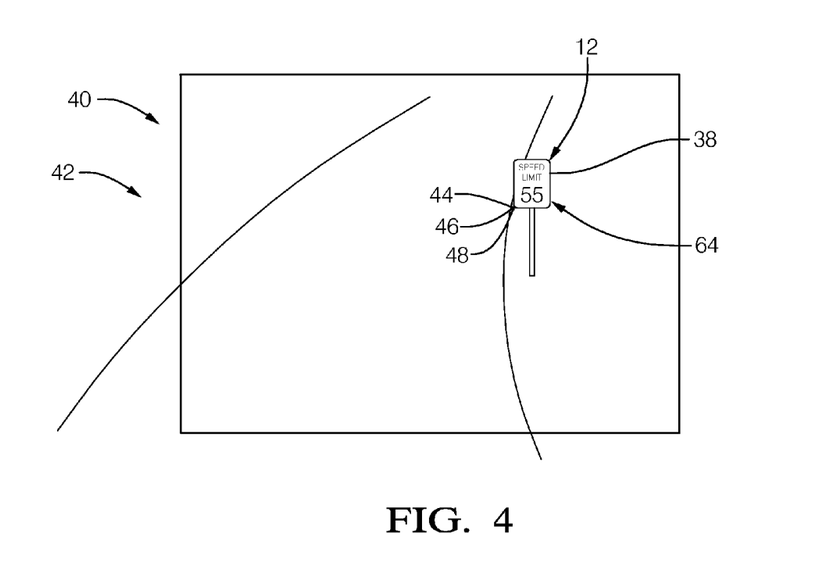
FIG. 4 is an image from a camera of the system of FIG. 1 in accordance with one embodiment.

FIG. 4 illustrates a non-limiting example of a first image 40 captured by the first camera 20 and/or a second image 42 captured by the second camera at the first time t1. It is recognized that the images captured at the first time t1 would be different due to the different perspectives of the first camera 20 and the second camera 22, and any misalignment of the first camera 20 and the second camera 22. However, to simplify the illustrations and explanation, the image shown in FIG. 4 will serve as an example for both the first image and the second image.

Step 232 may include determining a first position 44 of an object in the first image 40 from the first camera 20 captured at the first time t1. By way of example and not limitation, the first position 44 of the road sign 38 may be determined using known image processing techniques for edge detection of an object, and the first position 44 may be designated to be the lower-left corner of the road sign 38. The first position 44 may be saved by controller 24 as a coordinate pair corresponding to the location of the first position 44 in the first image 40, for example, a first coordinate pair x1, y1.

Step 232 may also include determining a second position 46 of the object 12 (i.e. the road sign 38) in the second image 42 from the second camera 22 captured at the first time t1. The second position 46 may be determined using the same techniques used to determine the first position 44, and store in by the controller 24 as a second coordinate pair x2, y2. As noted above, using FIG. 4 to illustrate both the first image 40 and the second image 42 is only for convenience, and it should be understood that the actual images from the first camera 20 and the second camera 22 would be different, and so it is understood that the first coordinate pair x1, y1 would not have the same value for the x and y coordinates as the second coordinate pair x2, y2.

Step 232 may also include determining an initial location 48 of the object 12 relative to the vehicle 14 at the first time t1 based on triangulation of the first image 40 and the second image 42. Determining the initial location 48 may include assuming that the initial location 48 is a known distance above the ground because the object 12 has been identified as being a road sign 38. Determining the initial location 48 may also include assuming a value for the distance D between the first optical centerline 18A and the second optical centerline 18B, and temporarily assuming that the optical centerlines are parallel to the roadway 16, and parallel to each other. Then by taking into account the lens characteristic of the cameras and the prior assumptions, determining the initial location 48 of the road sign 38 relative to the vehicle 14 is a matter of using known geometric formulas. The initial location 48 may be stored by the controller 24 in a number of formats including, for example, Cartesian coordinates: xI, yI, zI corresponding to a relative difference of the initial location 48 relative to some point of reference for the vehicle 14. Alternatively, the initial location may be stored as polar coordinates: rI, θI, ψI corresponding to a range (r), horizontal angle (θ), and vertical angle (ψ) from the vehicle 14 to the initial location 48. A more specific example of the method 200 using exemplary values for the various variables described herein will be provided following this general description of the method 200.

Steps 234, 236, 238 and 240 describe an iterative process of tracking vehicle motion while monitoring the object 12 in subsequent images to determine when subsequent images will be obtained.

Step 234 may include monitoring vehicle dynamics so that vehicle displacement and change in orientation may be determined. Vehicle dynamics can be determined by numerous potential information sources. Vehicle velocity may be determined by wheel speed and steering angle, GPS, or numerous other on-board sensors. Vehicle orientation may be determined by wheel speed and steering angle, on-board angular rate sensors, or other on-board sensing devices.

Figure 5:
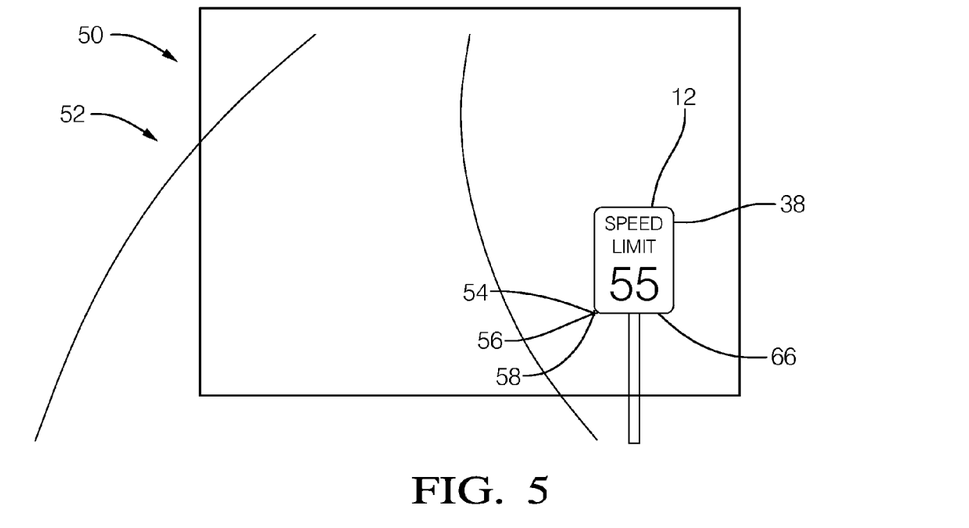
FIG. 5 is an image from a camera of the system of FIG. 1 in accordance with one embodiment.

Subsequent images, such as a third image 50 and a fourth image 52 (FIG. 5) are obtained in steps 236 and 238, and may be captured at a second time t2, and may include the object 12, for example the road sign 38. As such, the process may include determining the second time t2 if tracking the object indicates that relative displacement of the object 12 and the vehicle 14 is greater than an object displacement threshold, five meters (5 m) for example. Alternatively, the process may include determining the second time t2 if monitoring the vehicle displacement indicates that the vehicle displacement is greater than a vehicle displacement threshold, five meters (5 m) for example.

Step 240 may include monitoring motion of the object in the subsequent images from the first camera 20 and the second camera 22 after the first time t1. If the vehicle 14 moves forward after the first time t1, objects in the subsequent images may appear to flow towards the boundary 30 of the image. The boundary 30 may be determined by the actual edge of the image sensor, or may be determined by a fixed occluding object within the image such as the hood of the host vehicle. It is advantageous to allow the reference image to get as close as possible to the usable boundary 30 of the image to allow for the maximum practical relative movement of the object after the initial location 48 is determined. Step 240 monitors the progression of the object in the images and determines when the object has approached or intersects with the boundary 30 of the image. Once this point has been reached, control is passed to step 242 where the most recent images are stored as the third image 50 and the fourth image 52 taken at the second time t2.

Step 244 and step 246 are illustrated as being in parallel; however it is recognize that the steps may be performed in series, and in either order. Step 244 may include determining a third position 54 of the object 12 in a third image 50 from the first camera 20 captured at the second time t2 distinct from the first time t1, similar to as described above with regard to FIG. 4 and step 232. Similarly, step 244 may include determining a fourth position 56 of the object 12 in a fourth image 52 from the second camera 22 captured at the second time t2. Accordingly, the third position 54 may be saved by controller 24 as a coordinate pair corresponding to the location of the third position 54 in the third image 50, for example, a third coordinate pair x3, y3. Similarly, the fourth position 56 may be assigned a fourth coordinate pair x4, y4.

Figure 6:
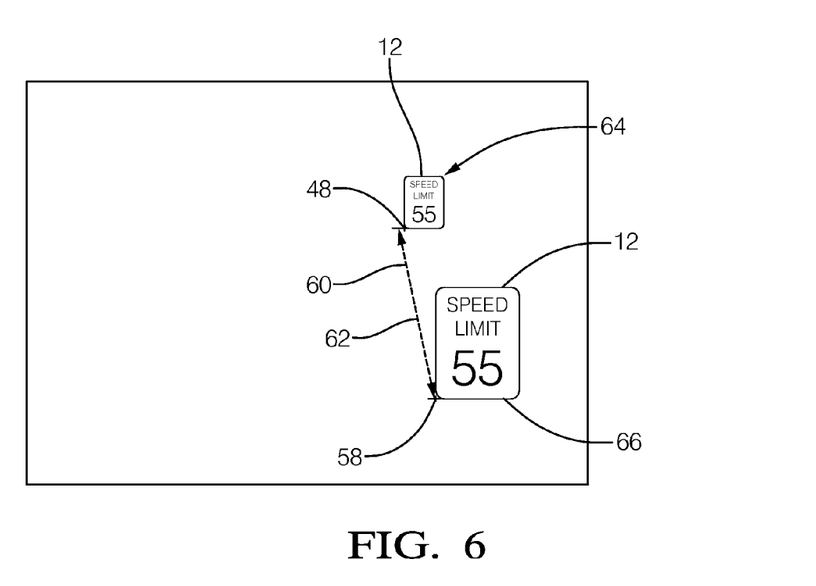
FIG. 6 is an illustration of a composite of the images in FIGS. 4 and 5 in accordance with one embodiment.

It also follows that step 244 may include determining a subsequent location 58 of the object 12 relative to the vehicle at the second time t2 based on triangulation of the third image 50 and the fourth image 52 using the third coordinate pair x3, y3 and the fourth coordinate pair x4, y4 as previously described. Having determined the initial location 48 at the first time t1, and the subsequent location 58 at the second time t2, step 244 may also include determining an observed displacement 60 (FIG. 6) of the object relative to the vehicle based on a difference of the initial location 48 and the subsequent location 58. It should be understood that FIG. 6 is not an image captured from a camera, but is used to illustrate the relative location difference of the object 12 shown in FIGS. 4 and 5. Also, as with FIGS. 3-5, FIG. 6 is not suggesting that both cameras would result in the same observation, but a single drawing is presented only to simplify and limit the number of drawings presented.

Step 246 may include determining a predicted final position of the object based on the initial location 48 determined in step 232, and a vehicle displacement determined by step 234. That is, step 246 may include determining a predicted displacement 62 of the object 12 relative to the vehicle 14 based a difference of vehicle position at the first time t1 and the second time t2. Alternatively, if vehicle position or vehicle motion is not readily determined, the predicted displacement 62 may be determined based on a difference of an initial size 64 of the image of the object 12 in the first image 40, and a subsequent size 66 of the image of the object 12 in the third image 50. Alternatively, both techniques may be combined to improve the alignment correction process.

Step 248, the observed and predicted final locations or displacements of the object 12 are compared. While the example presented above is based on determining a point in an image, for example a corner, it is appreciated that comparison could be based on lines (edge) or frames (outline) of the initial and subsequent locations of the object 12.

Step 250 may include determining the extent of the difference between the observed displacement 60 and predicted displacement 62, or differences of the subsequent location 58 determined by triangulation, and a predicted subsequent location based on the initial location 48 and predicted motion of the vehicle 14 object, are evaluated to determine a triangulation correction for the first camera 20 and the second camera 22 with respect to the vehicle 14, and/or with respect to each other. That is, Step 250 may include determining a triangulation correction based on a difference of the observed displacement 60 and the predicted displacement 62 to correct for misalignment of the first camera 20 and the second camera 22 when determining object location based on triangulation of images from the first camera and the second camera. It is recognized that the alignment process may be repeated several times to optimize the triangulation correction as the first pass through the process may only partially correct any misalignment. By way of a more detailed example and not limitation, the following example is presented.

Figure 7:
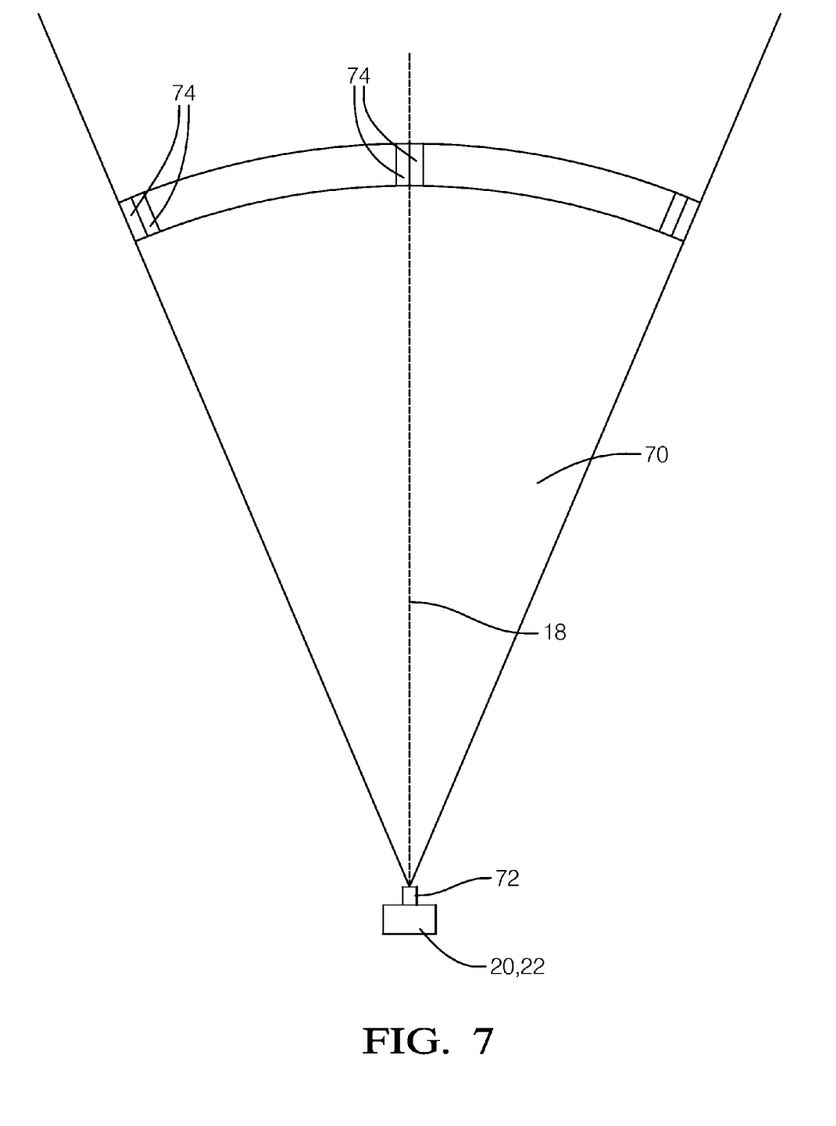
FIG. 7 is a diagram of a field of view of a camera of the system of FIG. 1 in accordance with one embodiment.

FIG. 7 illustrates a non-limiting example of a horizontal field of view 70 of the first camera 20 or the second camera 22 that includes an optical centerline 18 of the camera. A lens 72 of the camera focuses light onto an imager (not shown) within the camera. In general, the imager includes a two-dimensional array of pixels. A typical array size for a suitable camera is six-hundred-forty by four-hundred-eighty (640× 480) pixels, and this array size is used in this non-limiting example. By way of example and not limitation, the lens 72 may be configured to project a forty-five degree (45°) horizontal angle field of view (HFOV) onto the imager so that the field of view is effectively divided horizontally into six-hundred-forty substantially equal angular segments 74 of 0.070 degrees (i.e. 45 degrees/640 or 4.2 arcmin) each. It should be appreciated that a similar division of a vertical field of view occurs that would also have a resolution of 0.070 degrees, but that the vertical field of view (not shown) would be about 34 degrees (45 degrees*480/640=33.75 degrees).

Figure 8:
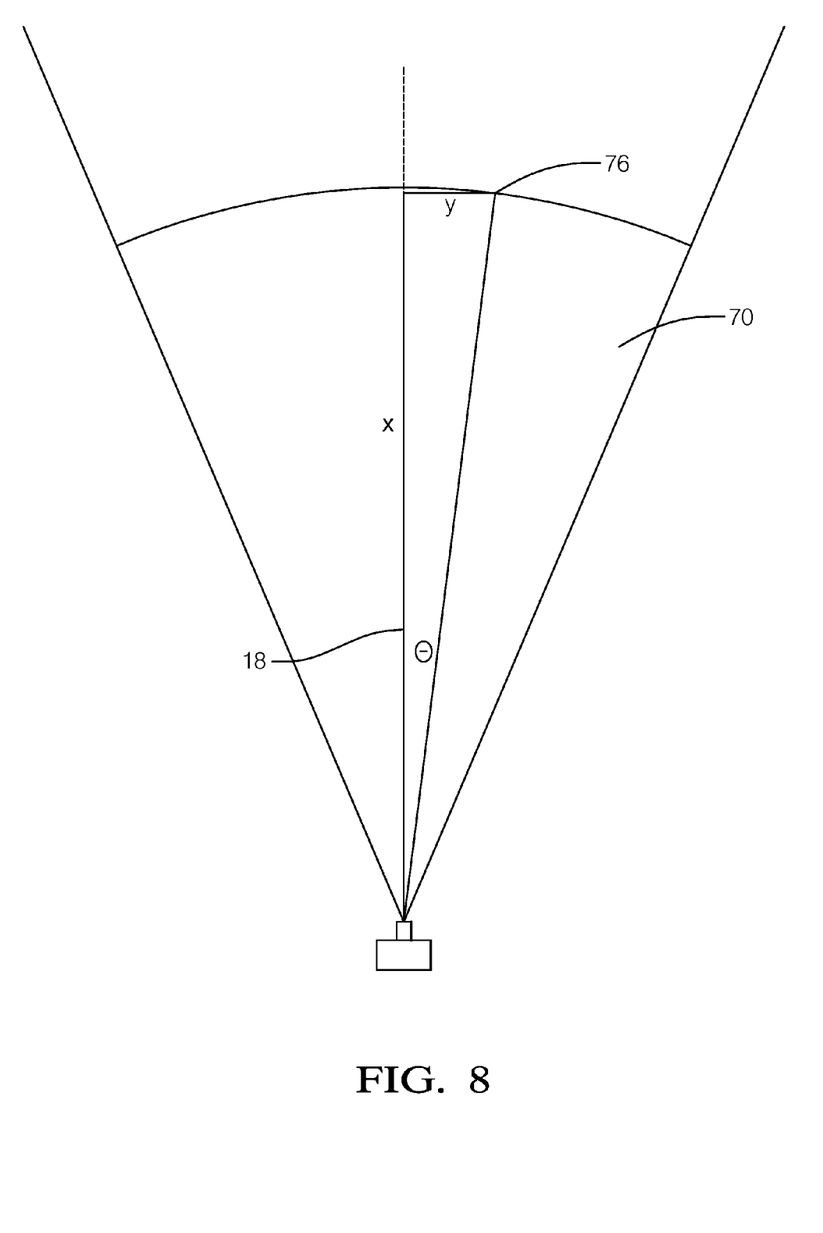
FIG. 8 is a diagram of a field of view of a camera of the system of FIG. 1 in accordance with one embodiment.

FIG. 8 illustrates a point 76 in the field of view 70. The point 76 may correspond to the lower left corner of the road sign 38 illustrated in FIGS. 4 and 5. The location on the imager of an image of the point 76 may be determined using known geometric equations. In the case above, if a distance x is forty meters (40 m) and a distance y is four meters (4 m), then angle $\Theta$ can be calculated as $\tan^{-1}(4/40)=5.71°$. Using the angle-per-pixel resolution determined above, the image of the point 76 on the imager is eighty-two (82) pixels to the right of an intersection of the optical centerline 18 with the imager, or 402 pixels from the left edge of the imager. It is recognized that for an angle $\Theta$ that is small, less than two degrees for example, $\tan \Theta \cong \sin \Theta \cong \Theta$ (in radians). Therefore, for small angles, which is the case when $x>>y$, $\Theta \cong y/x$. For simplicity, this example will be shown using the small angle approximation. Those skilled in the art will appreciate that the more complex calculations may be required for accurate renderings of larger angles, and that the simplified explanation does not limit the description set forth herein.

Figure 9:
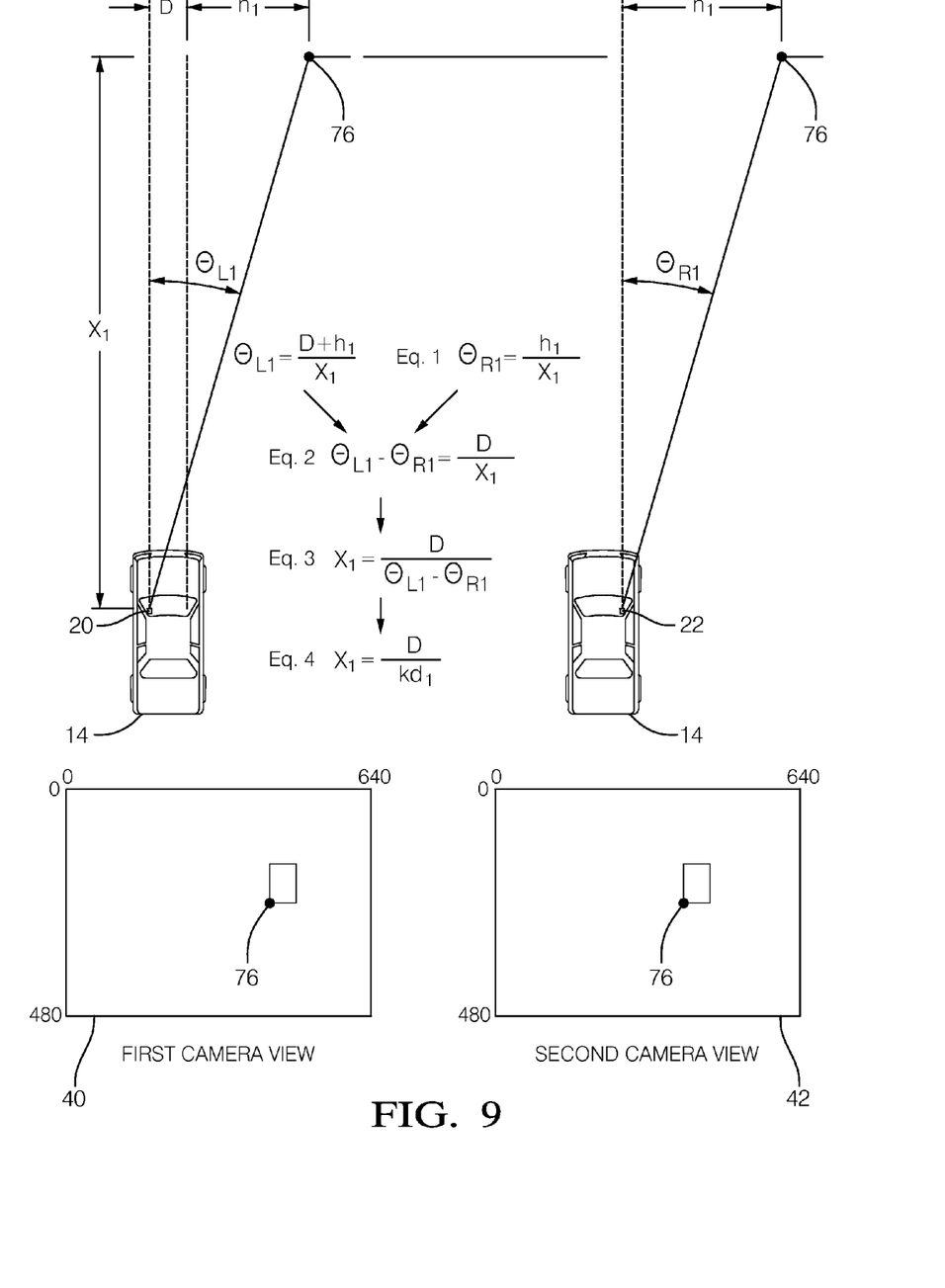
FIG. 9 is a comparative diagram of a field of view of the cameras of the system of FIG. 1, and images recorded by those cameras, in accordance with one embodiment.

FIG. 9 further illustrates this example of detecting the point 76 in the first image 40 by the first camera 20 and the second image 42 by the second camera 22. Assuming for the moment that the first camera 20 and the second camera 22 are aligned such that the first optical center line 18A and the second optical centerline 18B are parallel, the point 76 will appear in different places in the first and second images from the two cameras. The difference in location of the image of the point 76 on the first and second images depends on the geometry of the system, namely the angle of the field of view of the cameras (HFOV, 45 degrees in this example, which determines the angle-per-pixel resolution), the separation distance D between the optical centerlines (18A, 18B), and the first distance X1 to the point 76 from each of the two cameras. When the HFOV and separation distance D are known, the first distance X1 to the point 76 from the two cameras can be determined. The angular displacement $\Theta L1$, $\Theta R1$ of the point 76 from the optical centerlines (18A, 18B) of each camera (20, 22) is given by the pair of equations designated Eq. 1, respectively. The difference between those two angles becomes a function of the separation distance D and the first distance X1 to the point 76 in Eq. 2. Solving for the distance gives it as a function of the camera separation and the angle difference in Eq. 3. Since the pixel location in the images is a function of the angle, the angle difference can be expressed as a function of the pixel difference between the two images (16 pixels in this example) represented by D in Eq. 4, multiplied by the angle-per-pixel scaling represented in the equation by k. The given example assumes 640 pixels across a 45° HFOV and a distance of 50 m to the point of interest resulting in a disparity of 16 pixels.

Figure 10:
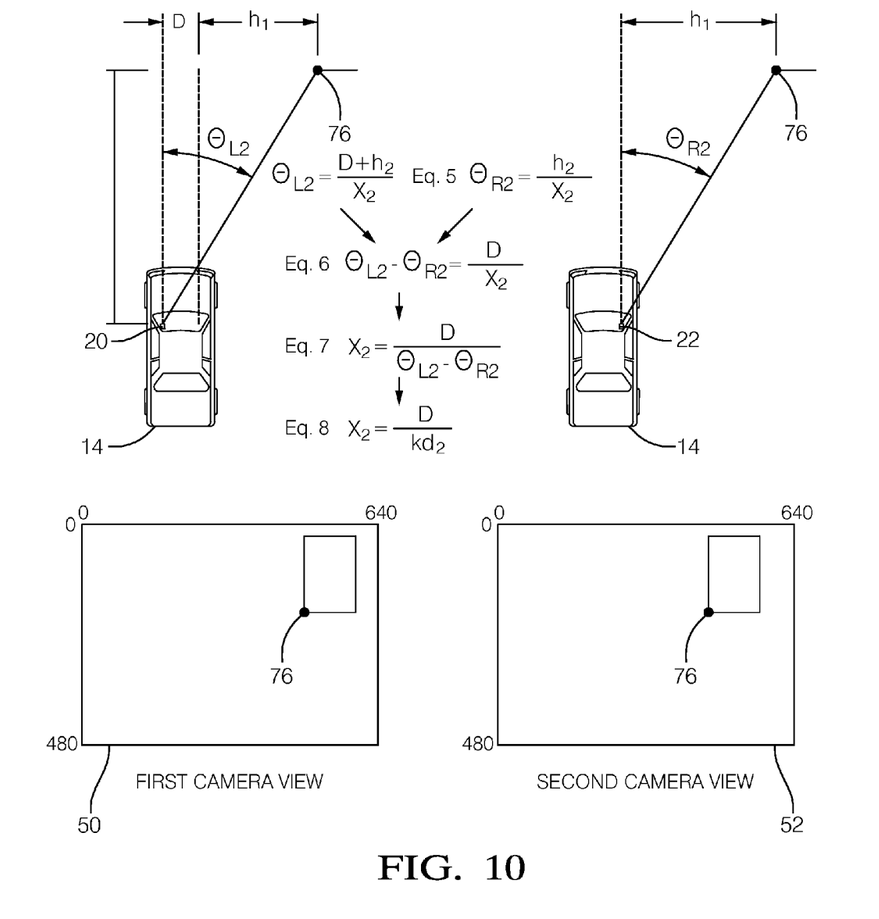
FIG. 10 is a comparative diagram of a field of view of the cameras of the system of FIG. 1, and images recorded by those cameras, in accordance with one embodiment.

FIG. 10 illustrates a non-limiting example of a subsequent measurement made after the vehicle 14 has moved forward will result in a different disparity (pixel difference) indicating a second distance X2 to the point 76. Observed displacement or movement relative to the third image 50 and the fourth image 52 is determined by detecting the point 76 in the third image 50 by the first camera 20 and the fourth image 52 by the second camera 22. The equations are essentially the same with subscripts updated to indicate the second measurement time. This example assumes the same 45° HFOV at a distance of 20 m resulting in a disparity of 41 pixels.

Table 1 below shows the distance determined by a stereo imaging system in three cases: proper calibration, minus five (−5) pixel misalignment so that the optical centerlines 18A, 18B converge and eventually cross (i.e. camera views are "cross-eyed") and a plus five (+5) pixel misalignment so that camera centerlines diverge (i.e. the camera views are "cock-eyed"). Note that a five-pixel misalignment equates to a camera yaw angle orientation difference of five times the angle-per-pixel resolution, or zero-point-three-six degrees (0.36°) in this example. If the vehicle movement is tracked separately from the imaging system by monitoring a wheel speed sensor for example, and the predicted movement is measured as thirty-one meters (31 m), then the system can determine that the two misalignment cases show a mismatch between tracked vehicle movement and that inferred from the vision system.

TABLE 1

| Time | Disparity | Delta-Theta | x |
|---|---|---|---|
| Properly Calibrated System | | | |
| 1 | 16 | 1.13 | 50.93 |
| 2 | 41 | 2.88 | 19.87 |
| Delta-x: 31.05 Actual travel distance | | | |
| −5 Pixel Error ("Cross-eyed") | | | |
| 1 | 11 | 0.77 | 74.08 |
| 2 | 36 | 2.53 | 22.64 |
| Delta-x: 51.44 Inferred travel distance greater than actual | | | |
| +5 Pixel Error ("Cock-eyed") | | | |
| 1 | 21 | 1.48 | 38.80 |
| 2 | 46 | 3.23 | 17.71 |
| Delta-x: 21.09 Inferred travel distance less than actual | | | |

Notice that the disparity difference in all three cases is the same (25 pixels) between the first measurement at 50 m and the second at 20 m. However, the difference in the implied distance of the object at the two measurement times differs significantly between all cases. If vehicle motion is tracked by other means (inertial, etc.), then the stereo vision system can be diagnosed and/or corrected/recalibrated.

This example assumes two cameras mounted at the same height—in other words, separated only in the horizontal axis. Actual camera misalignment can occur in both the horizontal (yaw) and vertical (pitch) axes simultaneously. Those skilled in the art will appreciate the principal of superposition where each misalignment can be detected and corrected/calibrated independently of the other factors.

Figure 11:
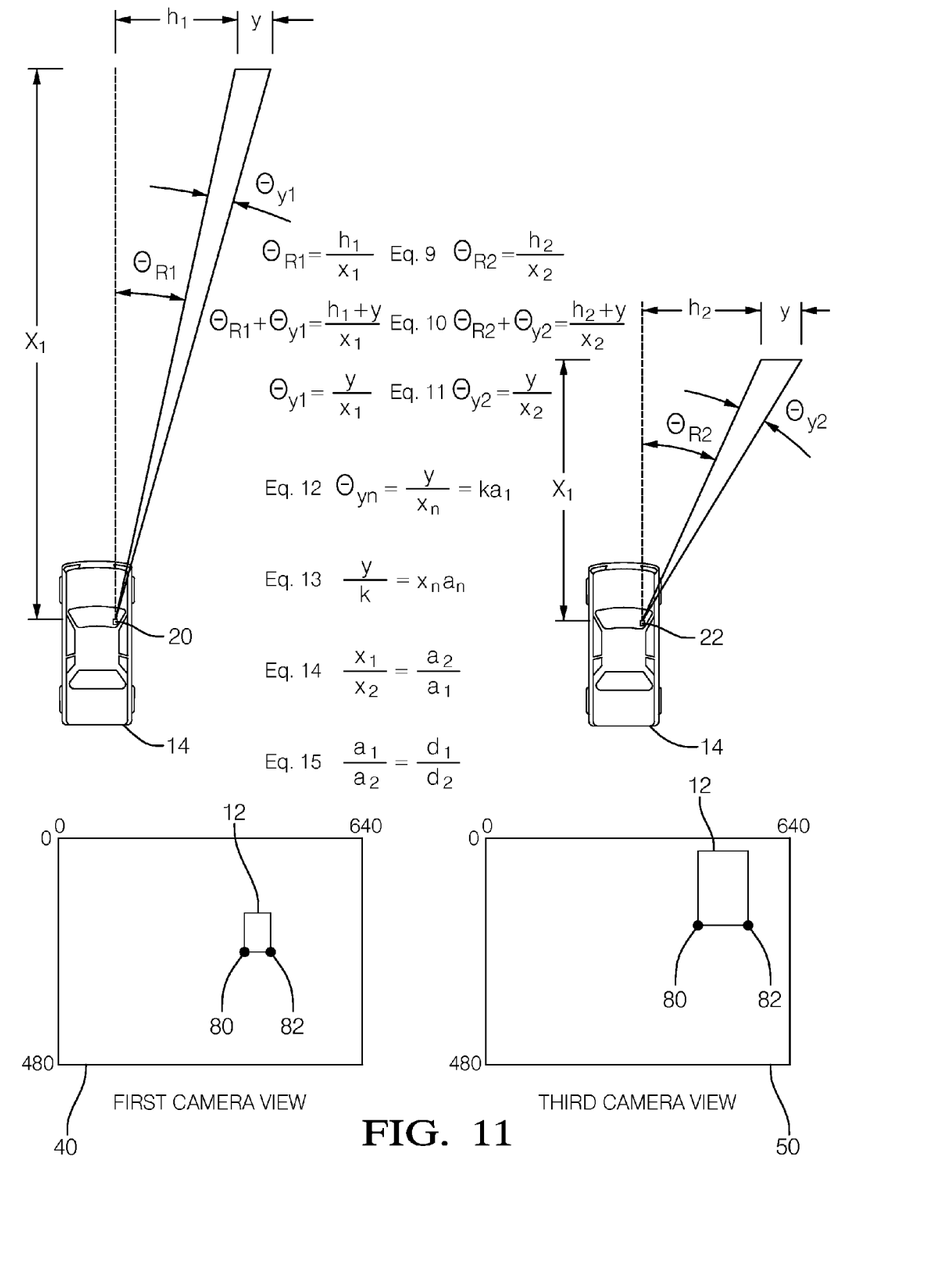
FIG. 11 is a comparative diagram of a field of view of the cameras of the system of FIG. 1, and images recorded by those cameras, in accordance with one embodiment.

FIG. 11 illustrates a non-limiting example of a process that determines a predicted displacement of the object 14 relative to the vehicle 14 based on a difference of an initial size 64 of the object 12 in the first image 40 and a subsequent size 66 of the object 12 in the third image 50. The change in observed size of the object 12 is compared to the change in observed distance of the object 12 in order to adjust alignment of a stereo imaging system.

The object 12 is identified to have two or more reference points, for example a first point 80 and a second point 82, that remain unambiguous when viewed from different distances and viewing angles. It is also preferred that the reference points are roughly equidistant from the first camera 20 or the second camera 22. In this non-limiting example, a road sign is the object 12. The sign placard is a substantially planar object with well-defined corners that will remain unambiguous from the various viewing angles likely to be encountered by a vehicle mounted object detection system. The direction of travel of a vehicle in the range of interest of the sign is roughly normal to the plane of the sign placard and therefore the corners are substantially equidistant to the object detection system. An object similar to a road sign is assumed in the following discussion. Those skilled in the art will understand that the principles taught in this concept can be extended to objects other than road signs and include non-preferred reference objects, but the present discussion is based on an object similar to a road sign for the sake of brevity and clarity. As with the prior examples, the small angle approximation where tan Θ≅sin Θ≅Θ is assumed.

In the following example, only one of the two cameras of the object detection system is required for detecting object size (e.g. the initial size 64 and the subsequent size 66). Either of the two cameras may be used, but it is preferred to use the camera having the smaller angle between the reference object and the optical axis of the camera. It should be recognized that the observed size of the reference object and the observed distance to the reference object have an inverse relationship. For example, when the observed object has increased in size by a factor of two (2), then the observed distance to that object should decrease by a factor of two (2).

Continuing with a more detailed description of this example, the distance to the reference object is detected in the same manner as that described for the previous example, and then compared with the reference object size, which is determined as follows. The reference object is recognized by the imaging system and two reference points are selected on the object for measurement at the first and second measurement times to determine the initial size 64 and the subsequent size 66. In the current example, the distance between the reference points occurs exclusively in the horizontal direction for simplicity. Those skilled in the art will recognize that a vertical direction or a combination of a horizontal and vertical direction may also be used.

The size of the reference object is indicated by a reference dimension y provided by the two points (the first point 80 and the second point 82) shown in the images (the first image 40 and the third image 50) taken at distinct times. The location in the image of the first point 80 is given for each image respectively by the two equations designated as Eq. 9. The location in the image of the second point 82 is given for each image respectively by the two equations designated as Eq. 10. The distance between the first point 80 and the second point 82 is given by the equations designated as Eq. 11, which are each determined by taking the difference between the respective Eq. 9 and Eq. 10. Eq. 12 shows the general case of the two equations designated as Eq. 11 where the specific subscript is replaced with the variable n. Eq. 12 also adds a representation of the reference dimension $ka_n$ where $a_n$ is the size in pixels of the angle subtending the reference dimension, and k is the angular resolution of the camera in degrees per pixel. The angular resolution of the camera k is a constant, and provided there is no significant change in observation perspective, the reference dimension y is also constant. Eq. 13 shows a rearrangement of Eq. 12 where the constants are gathered to one side of the equation and the variables are gathered to the other. Since the product of the reference dimension and the reference image distance are equal to a constant, it is obvious that the observed size of the reference dimension is inversely proportional to the distance of the reference object from the object detection system. Another method of expressing the inverse relationship is given by Eq. 14. Using Eq. 4 and Eq. 8 to substitute for x1 and x2 respectively in Eq. 14 provides Eq. 15. Eq. 15 shows that the ratio of the image disparity (which indicates distance of the reference object) is the same as the ratio of the reference dimension in pixels. However, this relationship holds true only in a properly aligned system. Any deviation from this relationship indicates a misalignment between the two cameras that requires adjustment.

In this example, the reference dimensional in the first image is 33 pixels. The reference dimension a2 in the second image is 66 pixels. In this example, the reference dimension changes by a factor of two between the first image 40 and the third image 50. By the relationship given in Eq. 15, the disparity indicating reference object distance should also differ by a factor of two between the first image 40 and the third image 50. A misalignment of the two cameras will create a fixed disparity offset. The disparity offset will change the disparity observed at the first image 40 and the third image 50 and therefore change the ratio of the disparity. Table 2 below shows the disparity measurements that would result from a system including cameras with a 1 m separation, each having an imager with a width of 640 pixels covering a 45 degree horizontal field of view, observing an object at fifty-four meters (54 m) and twenty-seven meters (27 m) distance in the first image 40 and the third image 50 respectively. The table shows the disparity measured by a properly aligned system and two systems misaligned by −5 and +5 pixels in the horizontal axis. The bottom row of the table gives the ratio of disparities from each system scenario. Note that the ratio of the disparities in each of the misaligned cases differs sufficiently from the aligned case that a misalignment can be detected and corrected as necessary.

TABLE 2

| Image | Distance | Disparity Aligned | Misaligned − 5 | Misaligned + 5 |
|---|---|---|---|---|
| First (40) | 54 | 15 | 10 | 20 |
| Third (52) | 27 | 30 | 25 | 35 |
|  | Ratio | 2.00 | 2.50 | 1.75 |

Accordingly, an object detection system (the system 10), a controller 24 for the system 10, and a method 200 for aligning stereoscopic cameras of the system 10 is provided. By iteratively repeating the alignment process, stereoscopic cameras (20, 22) of the system 10 may be electronically aligned, and so do not need to rely on a rigid structure for mounting the stereoscopic cameras. The alignment process makes use of objects that appear in the field of view of the cameras as part of normal operation of the vehicle, and so alignment of the stereoscopic cameras does not rely on placing known targets at known locations relative to the vehicle. Furthermore, alignment of the stereoscopic cameras can be performed on a continuous or periodic basis so that any misalignment due to temperature fluctuations, damage to the vehicle, or other causes of misalignment can be detected and corrected. Also, it is understood that the stereoscopic cameras can be subjected to non-linear motions over a short time span (e.g. due to motion and displacement from road crowning, cresting a hill, roundabout curves, "S" curves, etc.). For these situations, the alignment process can consider the combination of the difference of vehicle position and the difference of the object size.

While this invention has been described in terms of the preferred embodiments thereof, it is not intended to be so limited, but rather only to the extent set forth in the claims that follow.

We claim:

1. A method for aligning a stereo camera of a vehicle mounted object detection system, said system comprising a first camera and a second camera mounted spaced apart on a vehicle, said method comprising:
   determining a first position of an object in a first image from the first camera captured at a first time;

determining a second position of the object in a second image from the second camera captured at the first time;
determining an initial location of the object relative to the vehicle at the first time based on triangulation of the first image and the second image;
determining a third position of the object in a third image from the first camera captured at a second time distinct from the first time;
determining a fourth position of the object in a fourth image from the second camera captured at the second time;
determining a subsequent location of the object relative to the vehicle at the second time based on triangulation of the third image and the fourth image;
determining an observed displacement of the object relative to the vehicle based on a difference of the initial location and the subsequent location;
determining a predicted displacement of the object relative to the vehicle based on one of
  a) a difference of vehicle position at the first time and the second time, and
  b) a difference of an initial size of the object in the first image and a subsequent size of the object in the third image; and
determining a triangulation correction based on a difference of the observed displacement and the predicted displacement to correct for misalignment of the first camera and the second camera when determining object location based on triangulation of images from the first camera and the second camera.

2. The method in accordance with claim 1, wherein the step of determining a predicted displacement of the object relative to the vehicle is based on both a) the difference of vehicle position at the first time and the second time, and b) the difference of an initial size of the object in the first image and a subsequent size of the object in the third image.

3. The method in accordance with claim 1, wherein the method includes mounting the first camera spaced apart from the second camera by at least five-hundred millimeters (500 mm).

4. The method in accordance with claim 1, wherein the method includes determining that the initial size is greater than a size threshold prior to determining the initial location of the object.

5. The method in accordance with claim 1, wherein the method includes determining if the first position of the object intersects with an boundary of the first image, and searching for a new object if the object intersects with the boundary.

6. The method in accordance with claim 1, wherein the method includes tracking the object in images from the first camera and the second camera after the first time.

7. The method in accordance with claim 6, wherein the method includes determining the second time if tracking the object indicates that relative displacement of the object and the vehicle is greater than an object displacement threshold.

8. The method in accordance with claim 1, wherein the method includes monitoring vehicle displacement after the first time.

9. The method in accordance with claim 8, wherein the method includes determining the second time if monitoring the vehicle displacement indicates that the vehicle displacement is greater than a vehicle displacement threshold.

10. An object detection system for detecting an object proximate to a vehicle, said system comprising:
a first camera configured to be mounted on the vehicle;
a second camera configured to be mounted on the vehicle spaced apart from the first camera; and
a controller configured to receive images from the first camera and the second camera, said controller programmed to
  determine a first position of an object in a first image from the first camera captured at a first time;
  determine a second position of the object in a second image from the second camera captured at the first time;
  determine an initial location of the object relative to the vehicle at the first time based on triangulation of the first image and the second image;
  determine a third position of the object in a third image from the first camera captured at a second time distinct from the first time;
  determine a fourth position of the object in a fourth image from the second camera captured at the second time;
  determine a subsequent location of the object relative to the vehicle at the second time based on triangulation of the third image and the fourth image;
  determine an observed displacement of the object relative to the vehicle based on a difference of the initial location and the subsequent location;
  determine a predicted displacement of the object relative to the vehicle based on one of
    a) a difference of vehicle position at the first time and the second time, and
    b) a difference of an initial size of the object in the first image and a subsequent size of the object in the third image; and
  determine a triangulation correction based on a difference of the observed displacement and the predicted displacement to correct for misalignment of the first camera and the second camera when determine object location based on triangulation of images from the first camera and the second camera.

11. A controller for an object detection system for detecting an object proximate to a vehicle, said controller comprising:
a first input configured to receive a first signal from a first camera mounted on the vehicle;
a second input configured to receive a second signal from a second camera mounted on the vehicle spaced apart from the first camera; and
a processor configured to
  receive images from the first camera and the second camera;
  determine a first position of an object in a first image from the first camera captured at a first time;
  determine a second position of the object in a second image from the second camera captured at the first time;
  determine an initial location of the object relative to the vehicle at the first time based on triangulation of the first image and the second image;
  determine a third position of the object in a third image from the first camera captured at a second time distinct from the first time;
  determine a fourth position of the object in a fourth image from the second camera captured at the second time;
  determine a subsequent location of the object relative to the vehicle at the second time based on triangulation of the third image and the fourth image;
  determine an observed displacement of the object relative to the vehicle based on a difference of the initial location and the subsequent location;

determine a predicted displacement of the object relative to the vehicle based on one of
   a) a difference of vehicle position at the first time and the second time, and
   b) a difference of an initial size of the object in the first image and a subsequent size of the object in the third image; and determine a triangulation correction based on a difference of the observed displacement and the predicted displacement to correct for misalignment of the first camera and the second camera when determine object location based on triangulation of images from the first camera and the second camera.

\* \* \* \* \*